United States Patent
Nuestro

(10) Patent No.: US 6,801,928 B2
(45) Date of Patent: Oct. 5, 2004

(54) DYNAMIC TRANSLATION BETWEEN DATA NETWORK-BASED PROTOCOL IN A DATA-PACKET-NETWORK AND INTERACTIVE VOICE RESPONSE FUNCTIONS OF A TELEPHONY NETWORK

(75) Inventor: Marcialito Nuestro, Hayward, CA (US)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 726 days.

(21) Appl. No.: 09/827,548

(22) Filed: Apr. 6, 2001

(65) Prior Publication Data

US 2002/0059374 A1 May 16, 2002

Related U.S. Application Data

(63) Continuation-in-part of application No. 09/191,276, filed on Nov. 12, 1998.

(51) Int. Cl.[7] .................. G06F 15/16; H04L 12/66
(52) U.S. Cl. .................. 709/203; 709/219; 370/352
(58) Field of Search .................. 709/203, 217, 709/218, 219; 370/352

(56) References Cited

U.S. PATENT DOCUMENTS

| | | | |
|---|---|---|---|
| 6,011,792 A | * | 1/2000 | Miloslavsky ................ 370/352 |
| 6,011,844 A | | 1/2000 | Uppaluru et al. |
| 6,195,357 B1 | | 2/2001 | Polcyn |
| 6,459,697 B1 | * | 10/2002 | Neyman ................ 370/352 |
| 2002/0103998 A1 | * | 8/2002 | DeBruine ................ 713/153 |

FOREIGN PATENT DOCUMENTS

| WO | WO 98/57501 A | 12/1998 |
|---|---|---|
| WO | WO 00/28702 A | 5/2000 |

OTHER PUBLICATIONS

U.S. patent application Ser. No. 09/191,276, Neyman et al., Priority Claim.

* cited by examiner

Primary Examiner—Krisna Lim
(74) Attorney, Agent, or Firm—Donald R. Boys; Central Coast Patent Agency, Inc.

(57) ABSTRACT

A system for emulating interaction with an interactive voice response unit is provided. The system comprises, a client node connected to the network, the client node soliciting interaction with the interactive voice response unit and a proxy server node connected to the network, the server node accessible to client node, the interactive voice response unit accessible to the server node. A connection is established between the client node and the proxy server node, the proxy server node accepts data from the client node and translates the data into a format for interacting with the interactive voice response unit whereupon the data is then propagated to the interactive voice response unit. Response data resulting from the input data at the interactive voice response unit is propagated to the proxy server node whereupon the response data is translated into a format for dissemination at the client node and propagated thereto.

33 Claims, 5 Drawing Sheets

DYNAMIC TRANSLATION BETWEEN DATA NETWORK-BASED PROTOCOL IN A DATA-PACKET-NETWORK AND INTERACTIVE VOICE RESPONSE FUNCTIONS OF A TELEPHONY NETWORK

CROSS-REFERENCE TO RELATED DOCUMENTS

The present invention is a Continuation In Part (CIP) to U.S. application Ser. No. 09/191,276, Entitled An Integrated Telephone Network Combining a Packet Data Network and a Dedicated-Connection Network, filed Nov. 12, 1998.

FIELD OF THE INVENTION

The present invention is in the art of telecommunications including data-network-telephony (DNT) which encompasses Internet-protocol-network-telephony (IPNT), and pertains more particularly to methods and apparatus for providing dynamic cross-network translation between communications applications hosted either on a data-packet-network or on a telephony network.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regards to client satisfaction. Such computer-enhanced telephony is known in the art as computer-telephony integration (CTI).

Generally speaking, CTI implementations of various design and purpose are implemented both within individual call-centers and, in some cases, at the telephone network level. For example, processors running CTI software applications may be linked to telephone switches, service control points (SCP), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI and other hardware within a call-center is commonly referred to as customer premises equipment (CPE). It is the CTI processor and application software is such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display unit's (PC/VDU's) so that agents manning such stations may have access to stored data as well as being linked to incoming callers by telephone equipment. Such stations may be interconnected through the PC/VDUs by a local area network (LAN). One or more data or transaction servers may also be connected to the LAN that interconnects agent stations. The LAN is, in turn, connected to the CTI processor, which is connected to the call switching apparatus of the call center.

When a call arrives at a call center, whether or not the call has been pre-processed at an SCP, typically at least the telephone number of the calling line is made available to the receiving switch at the call center by the network provider. This service is available by most networks as caller-ID information in one of several formats such as Dialed Number Identification Service (DNIS). If the call center is computer-enhanced (CTI) the phone number of the calling party may be used as a cross-reference key to access additional information from a customer information system (CIS) database at a server on the network that connects the agent workstations. In this manner information pertinent to a call may be provided to an agent, often as a screen pop, and in some cases prior to a call being connected to the agent.

Proprietorship of CTI equipment both at individual call-centers and within a telephone network can vary widely. For example, a phone company may provide and lease CTI equipment to a service organization hosting a number of call-centers. A telecommunications company may provide and lease CTI equipment and capability to an organization hosting call centers. In many cases, a service organization (call center host) may obtain and implement it's own CTI capability and so on.

In recent years, advances in computer technology, telephony equipment, and infrastructure have provided many opportunities for improving telephone service in publicly-switched and private telephone intelligent networks. Similarly, development of a separate information and packet data network known as the Internet, together with advances in computer hardware and software have led to a new multi-media telephone system known in the art by several names. In this new systemology, telephone calls are simulated by multi-media computer equipment, and data, such as audio data, is transmitted over data networks as data packets. In this application the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional system is familiar to nearly all, and is often referred to in the art as Plain Old Telephony Service (POTS). In the POTS system calls are connection oriented lending to the preferred terminology, connection-orientated-switched-telephony or COST. The COST designation will be used extensively herein when describing typical connection orientated networks or calls.

The computer-simulated, or DNT systems, are familiar to those who use and understand computer systems. Perhaps the best example of DNT is telephone service provided over the Internet, which will be referred to herein as Internet Protocol Network Telephony (IPNT), by far the most extensive, but still a subset of DNT. DNT is a term used to describe basically any type of packet switched network whether public or private. Examples of DNT networks include the public Internet, Intranets, private company owned wide area networks (WANs), and so on. These DNT networks may operate using several differing or combined protocol, but generally are supportive of DNT.

Both systems use signals transmitted over network links. In fact, connection to data networks for DNT such as IPNT is typically accomplished over local telephone lines, used to reach such as an Internet Service Provider (ISP). The definitive difference is that COST telephony may be considered to be connection-oriented as previously described. In the COST system, calls are placed and connected by a specific dedicated path, and the connection path is maintained over the time of the call. Bandwidth is thus assured. Other calls and data do not share a connected channel path in a COST system. A DNT system, on the other hand, is not connection oriented or dedicated in terms of bandwidth. That is, data, including audio data, is prepared, sent, and received as data packets. The data packets share network links, and may travel by varied and variable paths.

Under ideal operating circumstances a DNT network, such as the Internet, has all of the audio quality of conventional public and private intelligent telephone-networks, and many advantages accruing from the aspect of direct computer-to-computer linking. However, DNT applications must share the bandwidth available on the network in which they are traveling. As a result, real-time voice communication may at times suffer dropout and delay (latency). This is at least partially due to packet loss experienced during periods of less-than-needed bandwidth which may prevail under certain conditions such as congestion during peak periods of use, and so on.

Recent improvements to available technologies associated with the transmission and reception of data packets during real-time DNT communication have enabled companies to successfully add DNT, principally IPNT capabilities to existing CTI call centers. Such improvements, as described herein and known to the inventor, include methods for guaranteeing available bandwidth or quality of service (QoS) for a transaction, improved mechanisms for organizing, coding, compressing, and carrying data more efficiently using less bandwidth, and methods and apparatus for intelligently replacing lost data via using voice supplementation methods and enhanced buffering capabilities.

In typical call centers, DNT is often accomplished via Internet connection wherein IPNT calls may be placed or received. Call centers may also be linked to sub-networks, including private networks that are linked to the Internet. Data packets arrive at the call center after having traveled from node-to-node through the DNT network or networks, and must be sorted and simulated at the call center on a PC/VDU (computer with display), or DN-capable telephone. DNT-capable call centers are more appropriately termed communication centers in the art because of the added scope of media possibilities presented therein. Therefore, the term communication center will be used extensively hereinafter when describing a call center.

In systems known to the inventors, incoming IPNT calls are processed and routed within an IPNT-capable call-center in much the same way as COST calls are routed in a CTI-enhanced center, using similar or identical routing rules, waiting queues, and so on, aside from the fact that there are two separate networks involved. Call centers having both CTI and IPNT capability utilize LAN-connected agent-stations with each station having a telephony-switch-connected headset or phone, and a PC connected, in most cases via LAN, to the network carrying the IPNT calls. Therefore, in most cases, IPNT calls are routed to the agent's PC while conventional telephony calls are routed to the agent's conventional telephone or headset. Typically separate lines and equipment must be implemented for each type of call weather COST or IPNT.

Much has been accomplished with regard to increasing the intelligence and capability of COST telephony at the network level before calls arrive at a call center. However, no such inroads have been made with regard to DNT telephony at network level. This is in part due to the nature of data-packet networks wherein data travels by varied and variable routes. Generally speaking, routing within a DNT network is indiscriminate from node to node with only the next destination address of the next node as a routing guideline for individual packets.

In COST systems known to the inventor, intelligent routing rules have been extended into the public network domain principally via the addition of CTI processing capability at the network level. For example, SCPs may be enhanced with a processor running varied software routines adapted to increase intelligence in call handling. Intelligent peripherals, statistical servers, transactional servers, and the like give added control regarding call handling to individual communication centers that support complimentary equipment and software.

Of particular notice is the recent implementation of T-server function (known to the inventor) within COST networks allowing the communication center to exert control over standard telephony switches and routers involved in routing both incoming and outgoing communication. The CTI processor renders the proprietary nature of many of these switches and routers as a non-factor with regards to compatibility with each other. Hence, the implementation renders systems platform-independent. These CTI Processors, known to the inventors as T-server functions (largely software) installed in the switch or router-connected processors can communicate with each other via a separate digital network that links the processors and routers to each other and to similar equipment in the communication center. In this way, call identification, destination verification, importance or priority of the call, and who best to deliver the call to may be decided before the call arrives in the domain of the communication center. Moreover, information about the call and the calling party may be routed ahead of the actual call so that agent's are better prepared to handle the call.

An integrated telephony network (DNT/COST) is known to the inventor and listed in the cross-reference section above. The network in that co-pending case includes both a connection-oriented switched telephony (COST) network and a data network telephony (DNT) network. The two separate networks are connected by a dual-ported interactive voice response (IVR) server. The ports of the IVR server are adapted to communicate with callers from each (either) network. In this architecture, a dual-ported translating bridge unit is provided and adapted to bi-directionally translate between the data protocols of the connected networks. Each network has at least one service control point (SCP) connected to the IVR, and calls received in either network are routed to the IVR typically for eliciting information from the caller. Further routing, either in the receiving network or over the translating bridge unit into and through the opposite network, is performed according to the information elicited from the caller. An SCP in the DNT network is implemented by connecting a computer-telephony integration (CTI) server to at least one IP (Internet Protocol) router in the DNT. The DNT network may be the Internet and the COST network can be any publicly switched telephone network.

The use of interactive voice response (IVR) units in telephony and in integrated telephony has dramatically increased as evident in the above-described system known to the inventor. By utilizing IVR functions in both DNT and in COST networks, communication center (CC) operators are able to reduce their costs. Another ongoing development is an ability to access communication center contacts through Internet-based interaction with an Interactive Web page. This activity also reduces CC cost for dedicated connections.

One problem with traditional communication center access where it concerns Web-based access is that typically the services are completely separate physically from the normal IVR interaction service established for CC clients accessing through a COST network. Moreover, even with a dual-capable IVR, the experience of clients on either side is remarkably different in interface technology and as a result, user experience.

What is clearly needed is a method and apparatus that enables a client accessing an integrated telephony/DNT communications center through the DNT side of the network to navigate to a COST IVR system according to standard IVR functions and results as is perceived by clients accessing the center through COST interaction. Such a system would function to unite communication center goals toward treatment of both COST and DNT sourced communications into the center.

SUMMARY OF THE INVENTION

In a preferred embodiment of the present invention, a network-based system for emulating interaction with an interactive voice response unit is provided. The system comprises, a client node connected to the network, the client node for soliciting interaction with the interactive voice response unit and a proxy server node connected to the network, the server node accessible to client node, the interactive voice response unit accessible to the server node. A client operating the client node establishes a connection with the proxy server node, the proxy server node excepts data input from the client node and translates the data input into a format for interacting with the interactive voice response unit whereupon the translated input data is then propagated to the interactive voice response unit and wherein response data resulting from the translated and propagated input is then propagated to the proxy server node whereupon the response data is translated into a format for dissemination at the client node and propagated thereto.

In a preferred embodiment the system is implemented on the Internet network. In a preferred aspect, the client node is a personal computer and the interactive voice response unit is hosted by a communications center. In one aspect, the format for interacting with the interactive voice response unit is telephone touch-tone recognition. In another aspect, the format for interacting with the interactive voice response unit is voice recognition. In one aspect, the response data resulting from the translated and propagated input is an analog voice recording. In this aspect, the analog voice recording is translated into a digital voice file before propagation to the client node. The digital voice file may be one of a WAV file, an MPEG file, or an H.323 protocol audio stream, or any other equivalent format.

In another aspect, the network-based system further comprises a second server node connected to the network, the second server node accessible to client node, the proxy server node accessible to the second server node. In this aspect the second server node interfaces with the client node and upon determination of need opens a connection with the proxy server node for interactive voice response interaction. In this aspect, the proxy server has access to digital documents held at the communications center hosting the interactive voice response unit. Also in this aspect, digital documents are accessed and served to client node along with the response data from the interactive voice response unit, determination for serving the documents based on need.

In another aspect of the present invention, a distributed software application for emulating interaction with an interactive voice response unit is provided. The software application comprises a client portion of the software application residing on a client node connected to a data-packet-network and a network portion of the software application residing on a proxy server node connected to the data-packet-network. The client portion of the software application identifies and transmits data input from the client node to the network portion of the software application at the proxy server node whereupon the network portion of the software application translates the data input into input acceptable to the interactive voice response unit, the network portion of the software application calling the interactive voice response unit and propagating the translated input data thereto and wherein the network portion of the software application receives response data from the interactive voice response unit and translates that data into response data acceptable to the client node and propagates the response data to the client node for dissemination.

In a preferred embodiment, the interactive voice response unit is hosted by a communications center and the data-packet-network is the Internet network. In a preferred aspect, the client node is a personal computer. In one aspect, the format for interacting with the interactive voice response unit is telephone touch-tone recognition. In another aspect, the format for interacting with the interactive voice response unit is voice recognition. In still another aspect, the response data comprises an analog voice recording. In this aspect, the response data acceptable to the client node comprises a one of a WAV file, an MPEG file, or an H.323 protocol audio stream.

In another aspect, the distributed software application further comprises a portion of the software hosted by the communications center and residing within a Web server also hosted by the communications center. The communications center portion of the distributed software application serves as an interface between the client portion of the software and the network portion of the software. In this aspect, the communications center portion of the distributed software application determines if there is a need for interactive voice response unit interaction at the beginning of a session between the client portion of the software and the communications center portion of the software.

In still another aspect of the present invention, a method for simulating interaction with an interactive voice response unit for a client operating on a data-packet-network is provided. The method comprises steps of, (a) establishing a data connection on the data-packet-network between the client and a server connected to the data-packet-network, the server functioning as a translation interface between the client and the interactive voice response unit, (b) accepting input data from the client at the server and translating the input data to a form acceptable to the interactive voice response unit, (c) establishing a connection between the server and the interactive voice response unit, (d) sending the translated input data received from the client to the interactive voice response unit, (e) receiving response data from the interactive voice response unit at the server and translating the response data into a form acceptable to the client, and (f) sending the translated response data to the client for dissemination.

In a preferred aspect of the method in step (a), the client is a personal computer and the data network is the Internet network. In one aspect, in step (a), the interactive voice response unit is hosted in a connection-oriented-switched-telephone network and the interfacing link between the server and interactive voice response unit is a CTI link. In another aspect of the method in step (b), the data form acceptable to the interactive voice response unit is telephone touch-tone signaling. In still another aspect of the method in step (b), the data form acceptable to the interactive voice response unit is voice recognition. In still another aspect of the method in step (b), the voice recognition function of the interactive voice response unit responds to computer-simulated voice. In one aspect of the method in step (c), the established connection is a telephony connection. In another aspect, the established connection is a data connection. In step (e), the data form acceptable to the client, in preferred aspects, comprises one of a WAV file, an MPEG file, or an H.323 protocol audio stream.

Now, for the first time, a method and apparatus is provided that enables a client accessing an integrated telephony/DNT communications center through the DNT side of the network to navigate a COST IVR system according to standard IVR function and results as is perceived by clients accessing the center through COST interaction. Such a system functions to unite communication center goals toward treatment of both COST and DNT sourced communications into the center.

BRIEF DESCRIPTION OF THE DRAWING FIGURES

DESCRIPTION OF THE PREFERRED EMBODIMENTS

According to a preferred embodiment of the present invention, a method and apparatus is provided for enhancing a DNT network with platform-independent call-routing intelligence that is controllable from within participating communication centers. Such enhancement is made possible through the implementation and distribution of an innovative instance of firmware and software at key locations within a DNT network whereby communication between such described instances and at least one such instance installed within a communication center is achieved via a separate and dedicated digital network. The system described in further detail below allows platform-independent routing of calls over a DNT network according to intelligent communication center rules, emulating the intelligence of the well-known COST systems provided by existing telephone network providers, and as defined above in the Background section.

Figure 1:
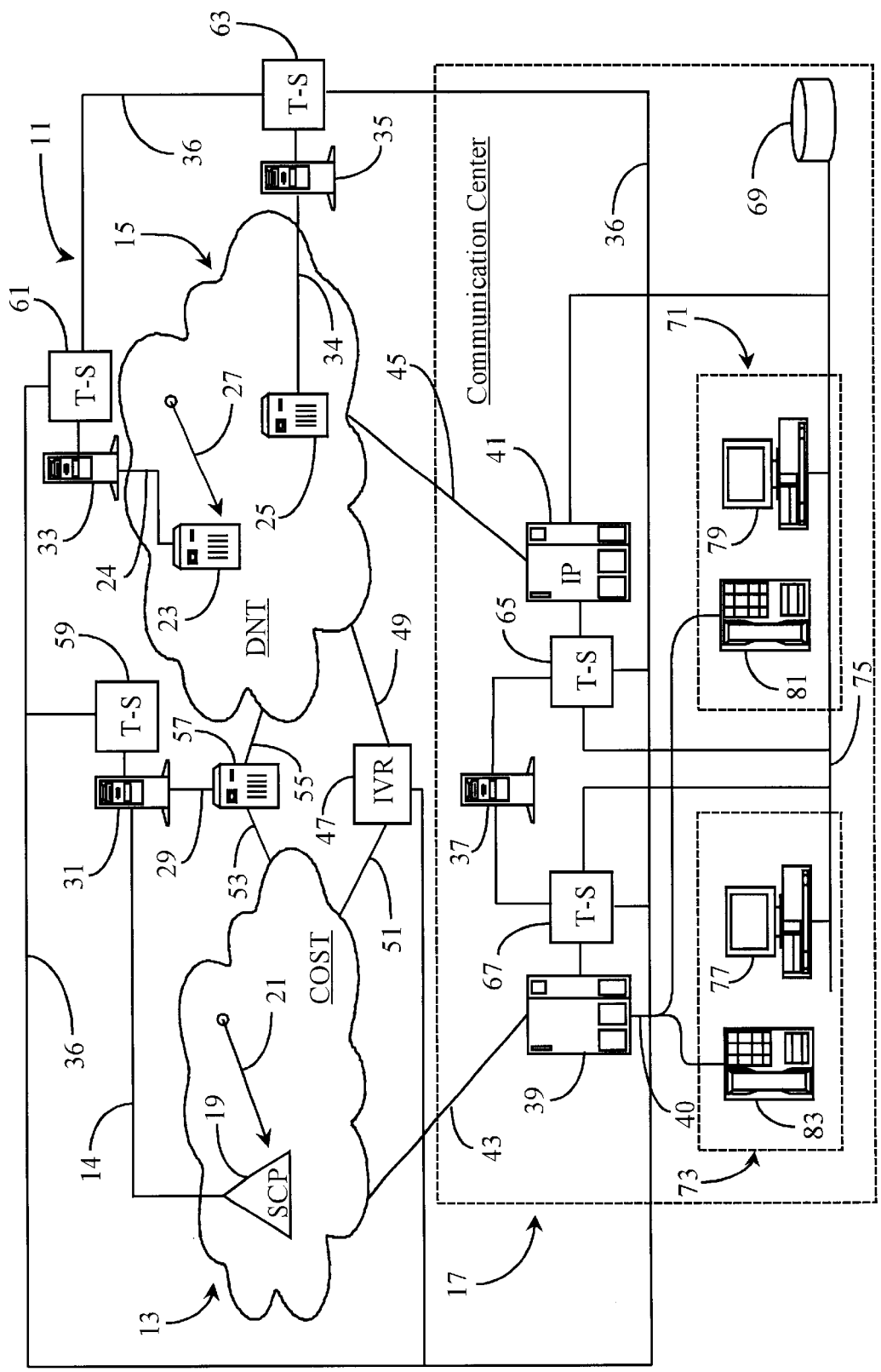
FIG. 1 is an overview of an enhanced communication network and connections according to an embodiment of the present invention.

FIG. 1 is an overview of an enhanced communication network and connections according to an embodiment of the present invention. A communication network 11 is illustrated and comprises a COST network 13, a DNT network 15, and a communication center 17. COST network 13 may be of the form of the PSTN network, a private telephony network, or any other type of COST network as may be known in the art. DNT network 15 may be of the form of the Internet, an Intranet, a private WAN, or any other type of switched-packet network over which DNT may be practiced. Communication center 17, for exemplary purposes, is a call center hosted by a commercial enterprise, and the equipment illustrated therein is illustrated as customer-premises equipment (CPE).

A Service Control Point (SCP) 19 is illustrated within COST network 13, and is adapted to receive COST calls represented via a vector 21 from anywhere in COST network 13. Such SCP functionality is well-known in the telephony arts. CTI equipment such as a CTI processor running instances of intelligent routines may be assumed to be present within COST network 13 and connected to SCP 19, and much such enhancement is not public domain, but proprietary to various organizations. There may be more than one CTI-enhanced SCP within COST network 13 without departing from the spirit and scope of the present invention. However the inventor chooses to illustrate only one for the purpose of simplifying explanation.

DNT network 15 shows two DNT IP nodes, node 23, and node 25. Such nodes are typically termed IP Routers in the art, and are commercially supplied by a number of vendors, such as Ascend Corporation and others. The term "routers" may be confusing in the present specification without some further explanation. The term as applied to IP Routers, such as routers 23 and 25, refers to relatively "dumb" machines that receive and forward data packets. The term "router" as applied in intelligent COST networks means a switching system capable of applying intelligent routing rules, typically retrieving and using extensive stored data. Efforts will be made herein to keep the distinction clear.

Nodes 23 and 25 are adapted for receiving and forwarding data packets from any network-connected source, and such packets may well be DNT packets. Such DNT calls are represented via a vector 27 shown incoming to IP node 23. Nodes 23 and 25 represent typical DNT routing nodes in that they may be of varied proprietorship and varied functionality as a result. IP nodes of different manufacture are typically capable of receiving and routing data packets in a network protocol, but may vary widely in further and enhanced functionality.

A node, as defined herein, may be any sort of IP router that is dedicated to receiving data from input port(s) and routing the data on to other node(s) through out-put port(s). In typical description, such nodes are often used for simple routing of data. Other types of nodes that may be present within DNT network 15 include server nodes adapted to serve requested information, such as an e-mail server or file server. Still other types of nodes may be interactive servers such as are used in conjunction with Internet chat rooms or the like. For the purpose of the present invention, nodes 23 and 25 are data routing nodes. However, in another embodiment, they may be multifunctional nodes.

In a DNT network such as network 15, each connected node has a unique address that identifies its location in the network. One node may have more than one address, though typically, this is not the case. This unique address is used as a sort of phone number or destination number for data packets traveling in the network. On the Internet, these addresses are known as IP addresses. IP addresses are not to be confused with universal resource locators (URL'S) which may be used to access specific served information such as a WEB page stored on a sever node. An IP address specifically locates a machine (node) connected to the network, and may be used to direct data packet traffic from one node to another.

As is known in the art, data packets are routed through a DNT network from node to node (from IP address to IP address). There may be many nodes along an extended data path wherein data-packets pause for further routing or may be redirected by such as address translation. Such node pauses, as experienced by traveling data-packets, are often termed "hops" in the art. For example, an IPNT call from a source computer may make many pauses (or hops) at such nodes before reaching a final IP address. In some cases, the final address will be an interactive server for linking two participants using a DNT application. In other cases, connection will be made from a source computer to a recipient computer (direct linking).

Referring back now to FIG. 1, nodes 23 and 25 each have a convention listing a number of IP addresses to other connected and compatible nodes within DNT network 15 for the purpose of mapping routes through the network toward the final destination of a particular data event. One node may contain many addresses of compatible nodes and has a limited ability to determine the best map or route to the next node based on, among other criteria, current network conditions including known bandwidth capability, supplied information within the arriving data packet, recent additions or upgrades to the network, and so on. Some systems also employ special software known as Quality-of-Service (QoS) software for prioritizing traffic and reserving bandwidth in some cases. The above described criteria and current art methods for using this criteria in data-packet routing is well-known in the art. Therefore much detail will not be provided except to note that in current routing methods, multiple data-packets associated with a single event are often routed to the destination via differing nodes along variable paths.

In order to provide special routing intelligence, in the sense of routing intelligence as known in COST networks, to IP nodes 23 and 25, innovative data routers termed intelligent data-routing processors (IDRPs) by the inventors are provided and connected in a geographically distributive fashion within DNT network 15 and at connected communication centers such as communication center 17. For example, an IDRP 35 is connected to IP node 25 via data link 34, while IP node 23 is connected to an IDRP 33 via a data link 24. IDRPs 33 and 35 are each running an instance of a CTI application suite known to the inventor as T-server (T-S) 61 and T-S 63 respectively. An IDRP such as IDRP 33, for example, is adapted to exert control over the functions of IP node 23 over the connecting data link. The IDRP monitors all activity of the IP Node (arriving data packets, IP addresses, header information, etc.), and is also adapted to exert control over operations of the connected IP router. Similar equipment and software (IDRPs/T-S routines) are also implemented within connected communication centers such as center 17, and at gateway locations between separate networks such as at a signaling system 7 (SS7) gateway 57 illustrated between COST network 13 and DNT network 15.

An SS7 gateway 57 is connected to an IDRP 31 running an instance of T-S 59 via data link 29. IDRP 31 is also connected to SCP 19 within COST network 13 via a CTI connection 14. In this case, IDRP 31 communicates both to gateway 57 and to SCP 19, thus setting it apart from IDRPs 33 and 35 in terms of dedicated function. It will be assumed for the purposes of the present invention that an IDRP connected to a gateway such as gateway 57 will have a stated variance in function by virtue of the equipment it is adapted to control and by virtue of T-S routine. In this case, T-S 59 will be variant in terms of specific command function from other T-S routines. Hence, T-S routines as a rule, are written specifically for the type of switch/router/gateway that they will control, and not all instances of a T-S are exactly alike. More specifically, T-S 59 will be written so as to provide command control to SCP 19 which comprises a network telephone switch, and also to SS7 gateway 57 which, in effect, is a digital converter which is adapted to convert Bellcore protocol signal from COST network 13 into data-packets and also data-packets from DNT network 15 to Bellcore signal protocol. It is to be understood that the SS7 gateway illustrated is exemplary, and similar gateways may be used translating between COST networks and DNT networks wherein different protocols than those described here are used.

An IDRP 37 illustrated within communication center 17 according to the distributive architecture as described above, is running separate instances of T-S software, namely T-S 67 adapted to control a CTI switch 39 over a CTI connection, and T-S 65 adapted to control an IP switch 41 for, in this case, IPNT traffic. In this arrangement, communication center 17 is adapted to handle both COST and DNT communication accounting for the added equipment. It will be apparent to the skilled artisan that elements 37, 67, and 65 may be shown as a single element, as all of the software functions may execute on a single processor.

According to an embodiment of the present invention, a separate digital network 36 connects all of the IDRPs running instances of T-S software in the illustrated system. In this example, connection is illustrated as being between separate instances of T-S routine such as between T-S 63, and T-S 61 for illustrative purpose only. In actual practice, the hard connections are made to various IDRPs via compatible ports installed or provided therein. Digital network 36 may be a privately owned or leased network and is specifically dedicated to providing a communicative link between each distributed IDRP such as IDRPs 31 and 37.

As an intelligent network, IDRPs on network 36 are provided with all of the knowledge regarding DNT network conditions such as available routes, bandwidth availability, IP addressing of similar IDRPs and connected nodes. Other intelligence includes the corporate identification and routing rules generic to participating companies hosting communication centers.

In the embodiment illustrated an innovative intelligent peripheral in the form of a dual-ported IVR 47 is provided and uniquely adapted to receive and interact with certain calls from both COST network 13 and DNT network 15 for the purpose of interacting with callers from either network that are destined to connected communication centers such as center 17. More specifically, IVR 47 is intended to be a first caller-interface or intercept for communication center 17 regarding callers from both networks. The IVR functions are well-known in COST networks as associated with SCPs for the purpose of providing routing of toll-free (800, 888) calls. For example, COST calls 21 arriving at SCP 19 are routed to IVR 47 over COST trunk 51. DNT calls 27 arriving at IP node 23 and requiring IVR are routed to IVR 47 over DNT connection 49. Callers from both networks may be given special numbers to call such as a 1-800 number (COST), or a DNT equivalent such that by using that number, IDRP 31 may recognize the call and route to IVR 47.

IVR 47 is, in this embodiment, dedicated for the purpose of interaction with callers through known methods such as via voice response, touch tone, or the like. It will be appreciated that IVR 47 may be enhanced to interact with DNT callers via added function such as typed text, interactive options offered on a WEB form, or other known methods such as are attributable to data networks and servers. Information obtained from interaction with IVR 47 may include caller ID, call destination, purpose of call, priority of call, and so on. In either instance, additional information obtained through IVR 47 is communicated to respective nodes/switches and can be interpreted via IDRP control. For example, interaction data regarding a COST caller resides in SCP 19, which is under control of IDRP 31. Interaction regarding a DNT caller resides at an IP node such as node 23 in this instance, which is under control of IDRP 33.

IVR 47, serving both networks, is in this embodiment, also connected to communication network 36, and using this network, may communicate with T-S at other locations in the overall system. It is necessary, for example, in interacting with COST callers, for the elicited information, or instructions derived therefrom, to be communicated to SCP 19 for routing purposes. In the case of the DNT network, the equivalent functionality may be achieved either by the network 36 or via the packet data network 15.

Within communication center 17, which, as previously described, can handle both COST and DNT calls, is illustrated a telephony switch 39 adapted to receive COST calls from COST network 13 via a trunk connection 43. Two agent workstations (there may be many more), workstation 73 and workstation 71 are adapted to include individual COST telephones 83, and 81 respectively. Cost phones 83 and 81 are connected to switch 39 via internal extension wiring 40. Workstations 73 and 71 are also adapted to include PC/VDU's 77 and 79 respectively. PC/VDU's 77 and 79 are connected to each other via a local-area-network (LAN) 75, and further connected via LAN 75 to an IP switch 41. IP switch 41 is adapted to receive incoming DNT calls from DNT network 15 via DNT connection 45. A customer information system (CIS) repository 69 is connected to LAN 75 and is therefore accessible to agents at workstations 73 and 71. CIS repository 69 contains stored information regarding callers such as addresses, credit history, product preferences, purchase history, and so on. Such data along with DNT events may be displayed on LAN-connected PC/VDU's such as PC/VDU 77 and PC/VDU 79.

IDRP 37 monitors and controls both IP switch 41 (DNT) and telephony switch 39 (COST) via T-S 65 and T-S 67 respectively. IDRP 37 is also connected to digital network 36 (connectivity illustrated through T-S). Each instance of T-S (67 and 65) is illustrated as LAN-connected (connections not numbered). In actual practice, T-S routines 67 and 65 may reside in IDRP 37 and the hard connections would be from IDRP 37 direct to each communications switch (two connections), from IDRP 37 to LAN 75 (one connection), and from IDRP 37 to digital network 36 (one connection). Separate or dual connections represented to LAN 75 and digital network 36 by way of separate instances if T-S are illustrative only and merely identifies two specific instances of T-S within IDRP 37.

Data regarding a caller obtained via IVR 47, whether from a DNT call or a COST call, may be sent to communication center 17 ahead of a call with respect to either network via digital network 36. For example, a command from IDRP 31 to SCP 19 may be to route a COST call, after interaction with IVR 47, to telephony switch 39 in communication center 17 via COST connection 43 while the data regarding the call is routed to IDRP 31, which then passes the data onto LAN 75 and ultimately to an agent's PC/VDU such as PC/VDU 79. Similarly, a DNT call, after interaction with IVR 47, may be routed from IP node 23 to IP node 25, and then be routed via DNT connection 45 to IP switch 41. Once at IP switch 41, it may be distributed via LAN 75 to either PC/VDU, 77 or 79. It should be noted that now, due to the intelligence added to DNT network 15 via the IDRPs, operates with logical equivalents of SCP 19. All of the routing intelligence and functions available in intelligent COST networks is now available in DNT network 15. In fact, due to the amorphous nature of the DNT network (highly interconnected), many functions can be provided in a more pervasive way than in the equivalent COST system.

Additional functionality by virtue of linked IDRPs running T-S software allows intelligent routing to be uniformly controlled across different platforms. For example, if node IP 23 is of a differing manufacture than IP node 25 and under normal conditions some functionality, such a QoS functionality, is not available on one of the nodes, it can be provided via software executing on the IDRP. In this way routing and all other functions become switch-independent. Moreover, with the use of SS7 gateway 57, intelligent routing is seamlessly integrated between networks 13 and 15. IVR 47 may, as previously described, obtain information through caller interaction from callers of either network to aid routing.

It will be apparent to one with skill in the art that there may be many more IDRPs, IVRs, SS7 gateways, SCPs, IP nodes, and so on than is illustrated in this embodiment without departing from the spirit and scope of the present invention. The inventor chooses to illustrate a quantitative minimum of equipment and connections for the purpose of simplicity in description.

Intelligent routing rules as may be practiced in a communication center such as in center 17 may be implemented at the network level within DNT 15 as well as COST network 13 by virtue of digital network 36 and IDRP connections as taught above. In practice, incoming calls from either network (calls 21 and calls 27) are first processed at IVR 47. Depending on information obtained through interaction, it is determined how the calls will be routed. Such determinations are made by connected IDRPs according to enterprise rules. For example, if it is determined that a COST call 21 should be routed into DNT network 15 based on IVR information, then IDRP 31 running an instance of T-S 59 would command SCP 19 to route call 21 through gateway 57 by way of connections 53 and 55 into DNT 15. Conversion from Bellcore protocol to IP format is performed in gateway 57. Once the call arrives at node 25 for example, IDRP 35 running an instance of T-S 63 has received information from IDRP 31 that the call should be further routed to IP switch 41 over DNT connection 45, and on to PC/VDU 79 over LAN 75. In this case, communication center 17 may have a 1-800 number for callers that may be linked to IP switch 41. IVR 47 may verify the destination during interaction with the caller.

It should be appreciated as well, that the intelligence injected into DNT network 15 may have many uses, not the least of which is network-wide QoS. With many routing nodes CTI-enhanced as taught, and sharing traffic data and so on, routing may be done in a network-wide fashion instead of node-to-node, and much may be accomplished relative to bandwidth sharing and latency issues.

In another example, a DNT call arrives at IP node 25 with the caller using a 1–800 equivalent, and is routed on to IVR 47. It may be determined that caller 27 needs to be routed through COST network 13 as the 1-800 equivalent number is to a COST connection such as telephony switch 39. IDRP 33 will send a command to node 23 to route the data packets through gateway 57 into the COST domain. Conversion from data packets to Bellcore signal is achieved in gateway 57. Once call 27 is at SCP 19, IDRP 31 confirms further routing to telephony switch 39 in communication center 17. In both cases, data obtained through IVR interaction may be sent to communication center 17 over digital network 36 and on to LAN 75, ultimately appearing on a designated agent's PC/VDU.

In other instances, COST calls may be kept in COST network 13 and DNT calls may be kept in DNT network 15. Because of the added intelligence afforded to IP nodes such as nodes 23 and 25 via connected IDRPs such as IDRPs 31 and 35, data-packets generic to an event may be held up in queue, caused to travel on one path instead of variable routes, and so on.

Additional intelligence added to digital network 36 may include real-time data network conditions, knowledge of quality of service (QoS) routes, routines for error routing, statistical-based routing, priority routing rules, skill-based routing rules, and so on. Digital network 36 may be a very large network comprising thousands of connected IP nodes and associated IDRPs (not every node needs an IDRP), IVRs, and SS7 gateways between networks. Digital network 36 may also link many geographically distant communication centers of varying capability. For example, a COST-only or DN-only communication center may be linked to digital network 36 and may practice the present invention as taught above.

Figure 2:
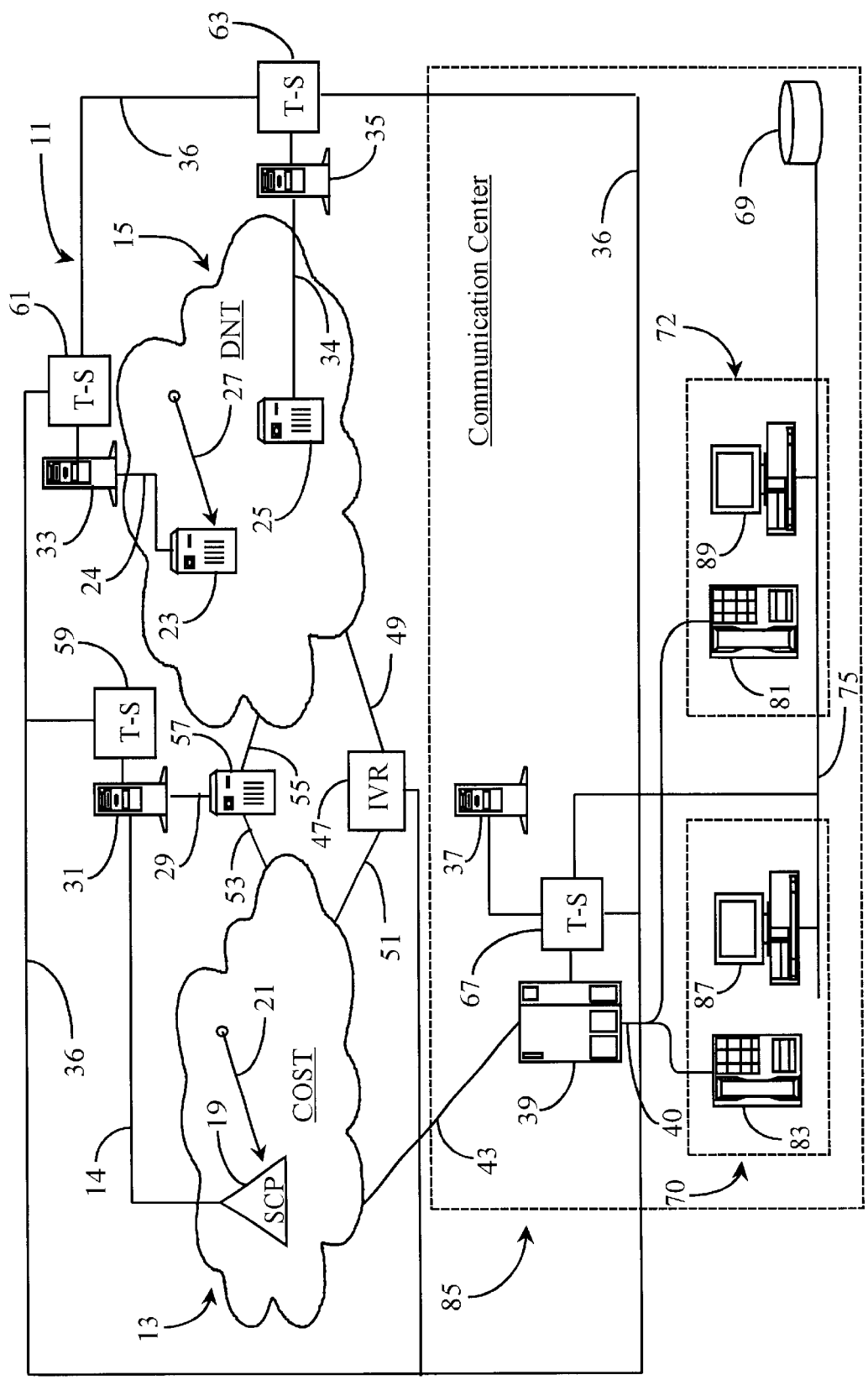
FIG. 2 is an overview of the communication network of FIG. 1 according to another embodiment of the present invention.

FIG. 2 is an overview of the communication network of FIG. 1 according to another embodiment of the present invention. Communication network 11, in this embodiment, is identical in virtually all respects to the communication center 11 of FIG. 1 except for an illustrated communication center 85 which accepts only COST calls. Therefore, elements of the present invention that have already been introduced with respect to FIG. 1 will not be re-introduced unless function has been altered according to an embodiment of the present invention.

Communication center 85, in this instance, is equipped to handle only COST calls. Therefore, equipment dedicated to handling DNT calls is not present. However, IDRP 37 of FIG. 1 is illustrated, but is only dedicated to the control of telephony switch 39. LAN 75 of FIG. 1 is also present here for receiving data ahead of a call as described with reference to FIG. 1. The LAN may also be used in the communication center for scripting to agents, agent training, and numerous other tasks.

In this embodiment, callers from DNT network 15 may be given a DNT 1–800 equivalent that is associated with telephony switch 39 of communication center 85. As described with reference to FIG. 1, DNT calls 27 (having the number identification) are intercepted via IVR 47 and interaction ensues. COST calls 21 are similarly intercepted via IVR 47.

In this case, all DNT calls to communication center 85 must be routed through SS7 gateway 57 and into COST network 13. IP node 23 is instructed via IDRP 33 to route call 27 through gateway 57 where it is converted to Bellcore signaling (COST standard). While call 27 waits at SCP 19 for further routing instruction, data regarding the call may be sent via digital network 36 to IDRP 37 and on to LAN 75. IDRP 31 instructs SCP 19 to route call 27 over trunk 43 to telephony switch 39. IDRP 37, in this case, may provide final routing instruction to telephony switch 39 as to which agent will take the call. Call 27 is then routed to a telephone of that agent such as telephone 83 in agent station 73. IDRP 37 has before, or at the same time that routing instructions were given to switch 39, routed IVR data regarding the call to a PC/VDU 87 which is associated with telephone 83, connected to LAN 75, and is adapted to display such information.

Destination numbers advertised to DNT callers may be to virtually any desired destination such as switch 39, SCP 19, a virtual queue (not shown), or other pre-assigned destinations. COST traffic may be routed through network 13 in normal fashion, except for an intercept via IVR 47 for the purpose of obtaining call-related data. By enhancing DNT network 15 with the method and apparatus of the present invention, COST communication center 85 may extend it's customer base to DNT callers without necessarily adding DNT equipment.

Figure 3:
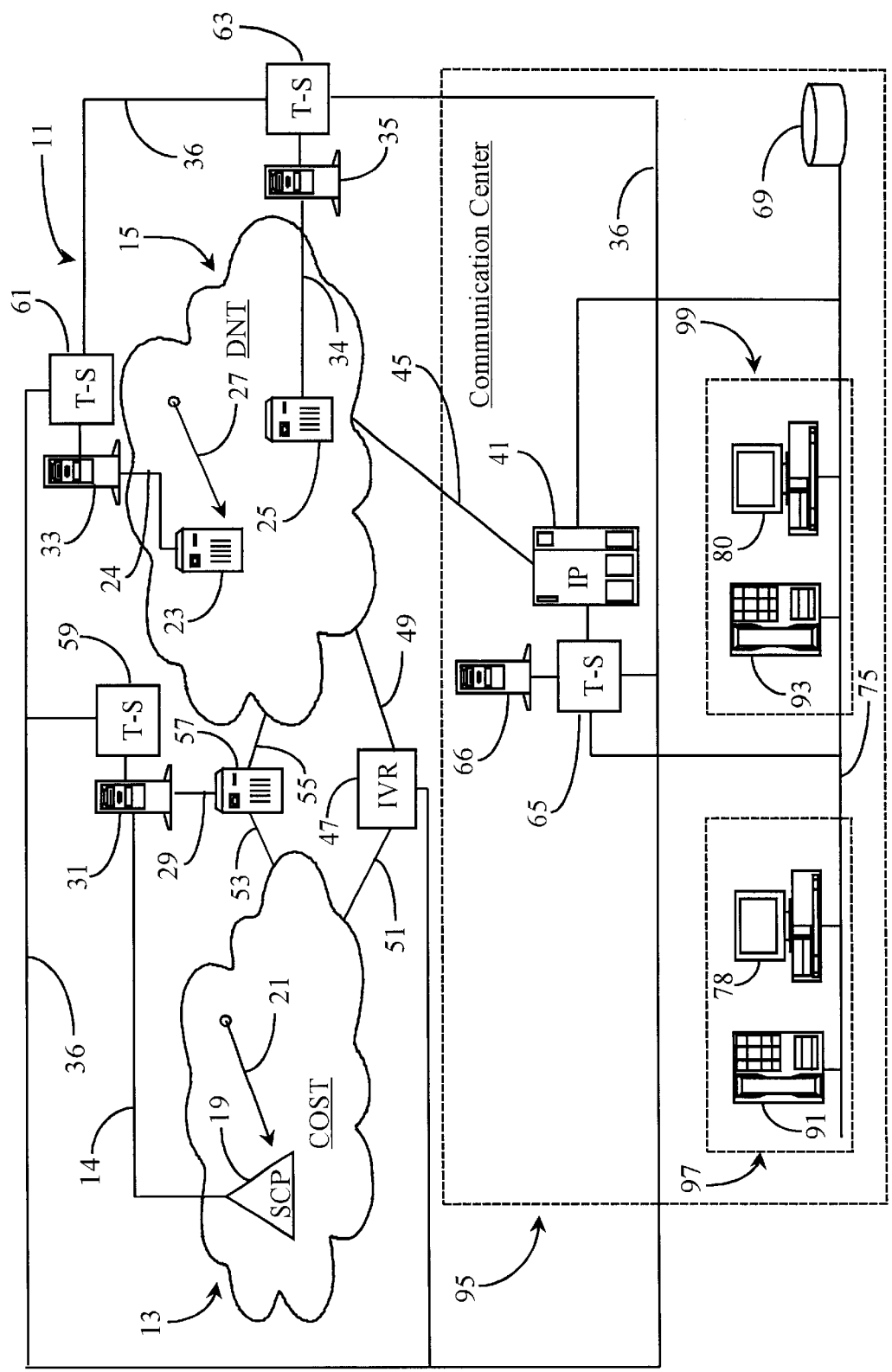
FIG. 3 is an overview of the communication center of FIG. 1 according to yet another embodiment of the present invention.

FIG. 3 is an overview of a communication system according to yet another embodiment of the present invention. Communication network 11, in this embodiment, is identical to the communication network 11 as represented with respect to FIGS. 2 and 1 except for a linked communication center 95 which accepts only DNT calls. Therefore, components of network 11 will not be reintroduced unless they have been functionally altered according to an embodiment of the present invention.

Communication center 95, as previously described, accepts only DNT calls. Therefore, previously described CTI COST telephony equipment such as was illustrated with respect to the embodiments of FIG. 1 and FIG. 2 is logically omitted. In this example, DNT communication center 95 may accept calls from both COST network 13 and DNT network 15.

With respect to COST calls arriving from network 13, they must be routed through SS7 gateway 57 and into DNT network 15 before being routed to communication center 95. By giving COST customers a special 1–800 number, calls 21 arrive at SCP 19 and are intercepted via IVR 47 as described in previous embodiments. After interaction with IVR 47, it may be determined that, for example, call 21 should be routed to IP node 25 within DNT network 15.

In this instance, call 21 is routed per instruction from IDRP 31 via trunk 51 and into gateway 47. Call 21 is then converted to DNT format (data-packets) and proceeds via DNT connection 49 to IP node 25. At IP node 25, IDRP 35 determines that call 21 should be further routed to IP switch 41 within communication center 95 via DNT connection 45. Data regarding call 21 as obtained during interaction with IVR 47 may be sent via digital network 36 to a connected IDRP 66 within center 95 for subsequent routing to a next-best available agent.

IDRP 66 is different from IDRP 37 of FIGS. 1 and 2 only in that it is adapted solely for handling DNT calls. Similarly, agent stations 97 and 99 differ from previously described stations in that they are specifically equipped for DNT communication and not for COST communication. For example, in workstation 97, a DNT telephone 97 is provided and adapted for DNT calls. In workstation 99, a DNT telephone 93 is similarly provided and adapted for DNT communication.

If it is determined by IDRP 66 to route call 21 to DNT 91, then IVR data regarding the call would be sent by IDRP 66 to PC/VDU 77 via LAN 75 ahead of, or at the time that call 21 is routed to phone 91 and so on. In this example, a DNT only communication center such as center 95 may increase it's exposure to include COST callers or customers. DNT network 15, now enhanced with routing intelligence, as taught herein and above, may accept all calls 21 from COST network 13 over SS7 gateway 57 wherein they are converted and further routed as normal DNT communication events.

It will be apparent to one with skill in the art that the communication network of the present invention may comprise many linked communication centers having one, or the other, or a mix of communication capability with regards to DNT and COST telephony. The different call center architectures of FIGS. 1, 2, and 3 may all be present and used in a single overall system in any quantity and mix. This will, in fact, typically be the case. The separate descriptions were only provided to avoid unnecessary complexity in drawings and descriptions.

It will also be apparent to one with skill in the art that the methods and apparatus of the present invention may be implemented over a large geographical region such as may be covered by a large DNT network such as the Internet. Equipment such as described IDRPs and digital connections comprising a separate digital network such as network 36 may be provided for lease, privately owned by one company, or collectively owned by several cooperating companies whose communication centers and corporate locations may be served.

Integrating routing intelligence between traditionally separate networks such as, for example, a COST network and the Internet, allows companies more options with regards to reaching broader customer bases and equipping individual communication centers for call handling.

Proxy Translation Between an IVR and DNT Callers

In one aspect of the invention, a mechanism is provided so that clients accessing a participating communication center from the DNT side may experience, through simulation techniques, IVR interaction in much the same fashion as a COST client would. This is accomplished in one embodiment of the invention by providing a proxy translation module between DNT user interface technologies and IVR functionality. One advantage of the system, which is described in enabling detail below, is that existing telephony applications become "ported" instantaneously into DNT space, rather than having to re-write them for DNT "version" and implementation.

Figure 4:
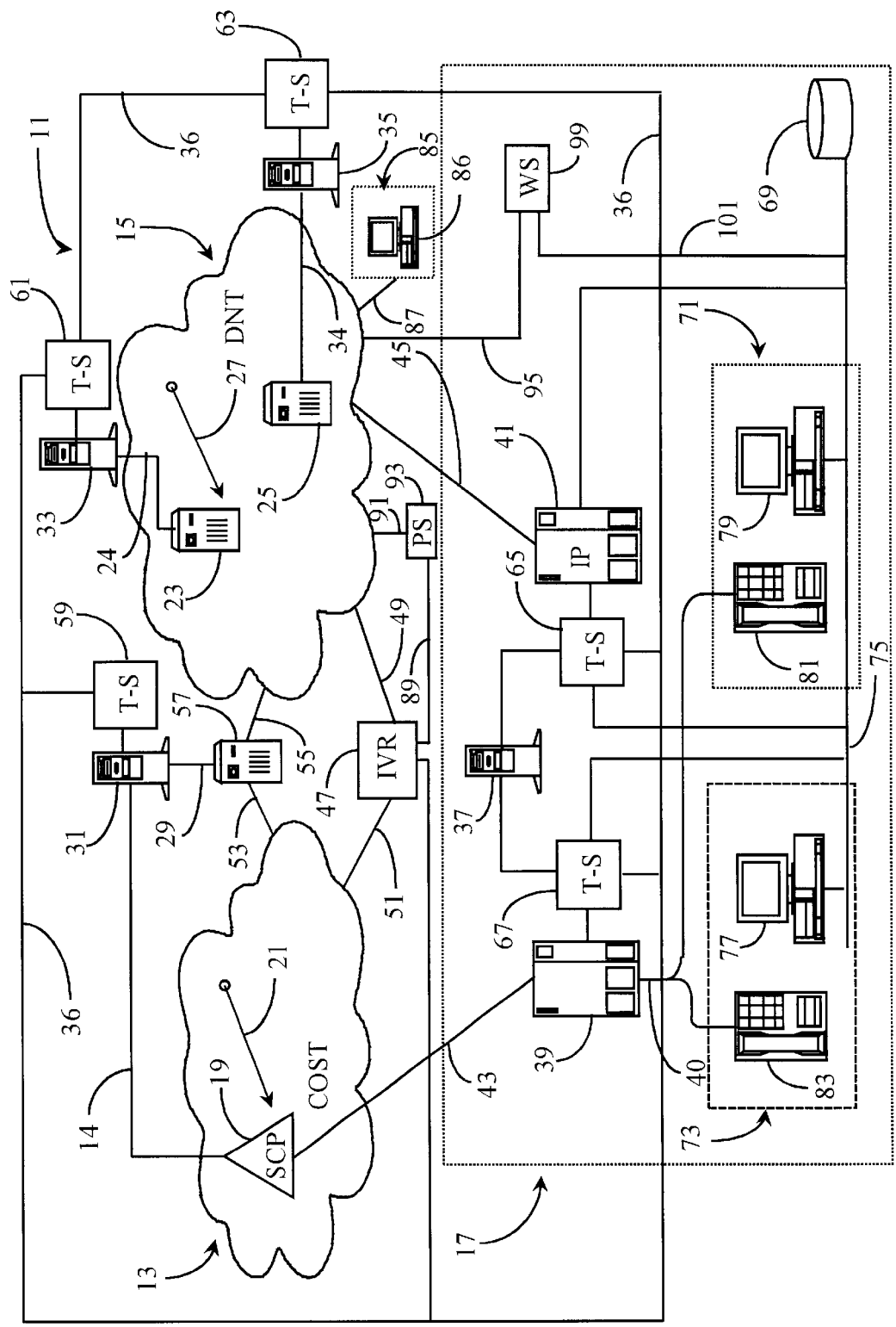
FIG. 4 is an overview of an enhanced communication network 11 wherein IVR/DNT emulation is practiced according to an embodiment of the present invention.

FIG. 4 is an overview of an enhanced communication network 11 wherein IVR/DNT emulation is practiced according to an embodiment of the present invention. Communication network 11 is essentially the same in configuration of network components as was described above with reference to FIGS. 1–3 of Ser. No. 09/191,276. Likewise, communication center 17 is identical to that of FIG. 1 in terms of dual DNT/COST capacity. The components of this example essentially unchanged from previous embodiments retain their same element numbers and will not be reintroduced.

For purposes of review, it was described with reference to FIG. 1 above, that IVR 47 is utilized as a first interface for clients accessing CC 17 from either COST network 13 or from DNT 15. According to interaction results, client calls are routed accordingly with applicable intelligent routing protocols extended into each network by virtue of distributed network 36 and connected IDRPs.

It can be assumed in the case of FIG. 1 above, that clients interacting with IVR 47 from DNT 15 have a much different experience than those interacting from COST network 13. DNT/IVR interactive routines must be formulated and presented for the appropriate medium. For example, instead of a voice response, a DNT client will typically have a text message to read or will be served a pre-prepared media file containing the voice message used at the COST interface of IVR 47. Traditionally, the interactive methods and results to clients of both interaction processes are quite different from each other. Likewise, administrators and software providers associated with CC 17 must provide additional resources to facilitate the DNT/IVR functionality.

Referring again to FIG. 4, a proxy server (PS) 93 is provided in this embodiment as a data control interface between DNT callers represented for example by incoming call 27 from DNT network 15, and IVR 47 such that callers may interact with and receive results from IVR 47 in a seamless fashion more like a typical COST IVR audio experience. PS 93 is adapted with software (not shown) for converting user DNT input into IVR-acceptable input, and for converting IVR output into simulated forms "playable" on a DNT-capable node such as a personal computer. PS 93 is connected to IVR 47 by a CTI- link 89. PS 93 is also connected to DNT network 15 by a network communication line 91. In this case, data line 49 would not be specifically required as nodes 23 or 25 access IVR 47 through line 91 in a preferred embodiment.

A Web server (WS) 99 is provided within CC 17 and adapted as a client communication interface between DNT clients and IVR 47 with PS 93 assuming the data control function of the described interface. In one embodiment, a data link (not shown) may be provided between PS 93 and WS 99. However, in this example, WS 99 and PS 93 communicate through normal network lines presumed within DNT cloud 15.

An exemplary DNT user premise 85 is illustrated by a computer icon 86 representing a device for DNT network communication. It will be appreciated that other network-capable appliances may be substituted for icon 86 without departing from the spirit and scope of the present invention. For example, a notebook computer or a hand-held computer, whether independently accessing or accessing through a host as a peripheral may be used as a client communication device. Communication may also be established in wireless mode where architecture and protocol permits. In this example, icon 86 (PC) is illustrated at user premise 85 as the most common mode for network access. This is especially true where DNT 15 is the Internet network with the most common access method being dial-up modem technology. PC 86 is illustrated as having network-access capability through a logically illustrated access line 87, which may be a telephone line connected to a modem at PC 86 for accessing an ISP. Intermediate COST components associated with dial-up access are not illustrated in this example in order to avoid confusion but may be assumed to be present.

WS 99 is, in this example, operated and hosted by a same entity hosting CC 17 and is, in this example, strategically located within center 17. In this embodiment, WS 99 is connected to LAN 75 by a LAN connection 101 and to DNT 15 by network access line 95. Line 95 may be a 24/7-access line or a dial-up line depending on enterprise design.

In practice of the present invention user 85 accesses network 15 over access line 87, presumably for the purpose of contacting CC 17 as represented by vector 27. However, instead of being routed through an IP node (23, 25) directly to IVR node 47 over communications line 49 as was previously described with reference to FIGS. 1–3 above, the request is routed through either or both nodes 23, 25 to WS 99 over access line 95. WS 99 communicates through PS 93 to IVR 47 for the purpose of accessing its function on behalf of clients (85) connected to WS 99 hosted by CC 17.

In one embodiment the functions of WS 99 and PS 93 may be implemented in one server node accessible to clients accessing through DNT 15. In such an embodiment, the single server may be hosted within CC17 or externally from CC 17. In still another embodiment, the functions may be further condensed by thorough incorporation of the appropriate SW and hardware into IP switch 41. The inventor illustrates the functions separately for illustrative purpose and convenience only. Incorporation of WS 99 as a separate piece of hardware within center 17 enables full interface with CIS 69 and with agent-messaging capabilities.

In a preferred embodiment user 85 has a client application (not shown) either pre-installed before communication, or downloaded at initialization of communication with CC 17 through WS 99. Routing protocol and method described with reference to FIGS. 1–3 are essentially unchanged in this embodiment with respect to communication between TS instances over network 36. One difference is in the way that client 85 perceives interaction with IVR 47 before routing.

Assume now that user 85 operating PC 86 has accessed WS 99 as described above. WS 99 determines that IVR interface is required to effect internal routing within center 17. SW running on WS 99 calls PS 93 through normal network lines and establishes an API session between IVR 47 and WS 99 through PS 93. IVR function, which may be described in terms of an initiative response to a request, plays an audible menu just as it would for a COST client, in fact the same menu in preferred embodiments. PS 93 downloads the menu over CTI link 89 and converts the audible event to a DNT-simulated version of the event. For example, a Voice over Internet Protocol (VoIP) file, a WAV file, an MP3 file or other equivalents may be used.

PS 93 then sends the data by the Internet to WS 99 over access line 95 wherein it is then downloaded to user 85 and played on PC 86 in the predetermined format. User 85, after listening to the audible file, may interact according to instructions in the file. Such instructions typically would entail response instructions such as touch-tone or voice response to prompts contained in the file. User 85 may respond accordingly to further interaction. Touch-tone response may be simulated on the numeric keyboard section of PC 86, or on a virtual phonepad on the screen, on which he can click using his mouse or other pointer device (not shown). Voice response may be enabled through a telephony headset as is common with IP telephony. It is noted herein that during interaction, user 85 is in live network session with IVR 47 through proxy 93 and WS 99. All data interaction simulates normal IVR function and response.

After determining routing protocol resulting from the IVR interaction, user 85 is (routed) connected to IP switch 41 and then on to the agent (77, 79) or automated service determined as a proper CC destination by the routing function. It is noted herein that information related to user 85 my also proceed along network 36 to LAN 75 through T-S 65 as was described with reference to FIGS. 1–3 above.

It will be apparent to one with skill in the art that the architectural connections and equipment illustrated herein can be implemented alternatively from the illustrated implementation without departing from the spirit and scope of the present invention. The inventor provides the illustrated hardware and connections as representative of just one possible implementation of the present invention. There are many possibilities.

Figure 5:
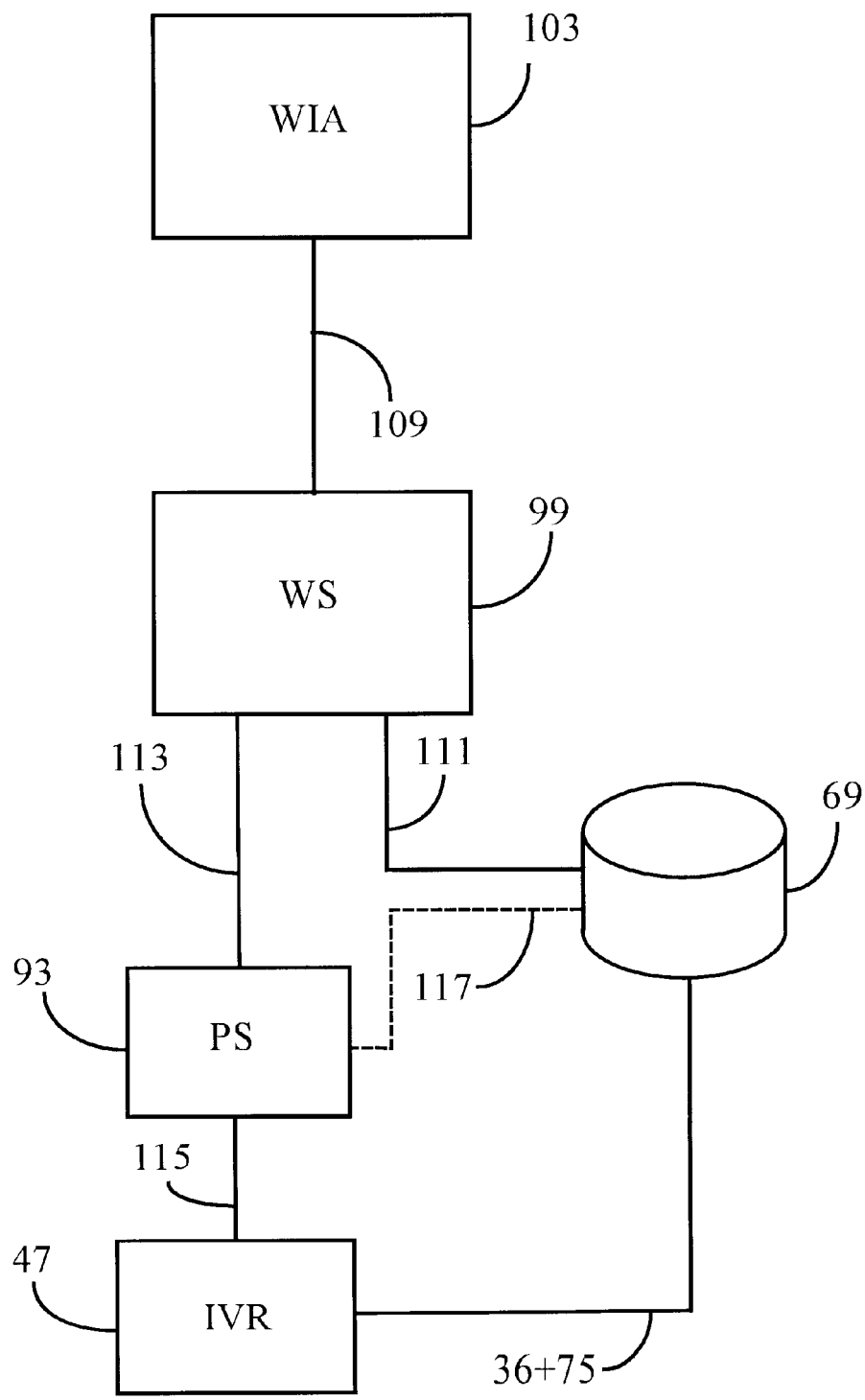
FIG. 5 is a block diagram illustrating SW communication between components of FIG. 4 according to an embodiment of the present invention.

FIG. 5 is a block diagram illustrating SW communication between components of FIG. 4 according to an embodiment of the present invention. A Web IVR application (WIA) 103 is provided as a client-side application described with reference to FIG. 4 above. WIA 103 resides on an accessing network-capable device analogous to PC 86 of FIG. 4. In one embodiment, WIA 103 may be pre-installed before communication with CC 17 is initiated. In another embodiment, WIA 103 is a downloaded application that is received after initial access to WS 99 of FIG. 4. In either case, WIA 103 is responsible for adapting a communicating device such as PC 86 for Web IVR interaction as has been termed by the inventor.

WS 99 communicates with and receives requests from WIA 103. WS 99 determines what, if any, interaction is required in order to route a DNT communication. API requests from WIA 103 are uploaded to WS 99 via logical link 109. In one embodiment, WS 99 is not required on a separate "Web server" but may be integrated into middle ware represented herein by PS 93.

PS 93 translates user input; in this case, a click stream into function calls to IVR 47. Functions represented can include but are not limited to voice message responses, user data messages, client database queries, transfers to agents, and so on. PS 93 also accesses voice files from IVR 47 and translates the IVR-audible recordings into equivalent DNT audible streams or files. These file formats may include, but are not limited to VoIP files, WAV files, MPEG files, H.323 audible streams and so on. In this example, WS 99 communicates requests by calling PS 93 over logical link 113 and invokes the function of PS 93.

Some requests will be determined at WS 99 to not require IVR functionality for routing purposes. In this case, WS 99 may dispose of the DNT caller by accessing requested information from database 69 over link 111 and delivering that information back to the DNT requester over link 109 into WIA 103 (client side). In this case WS 99 would not need to call PS 93 at all.

In the event that it is determined at WS 99 that the requesting client requires IVR interaction, a link (113) is opened to PS 93 by WS 99 on behalf of the client. Data submitted thereafter, in accordance with IVR interaction, is converted at PS 93 into function calls to IVR 47 made over link 115 simulating normal telephony interaction in COST mode. As IVR 47 responds to the input, the required files from IVR 47 are downloaded to PS 93 and converted to equivalent simulations that are then transmitted over link 113 to WS 99 and on to WIA 103 where they are appropriately implemented.

In this example, PS 93 can access CIS 69 on LAN 75 (FIG. 4) through network 36 and pull any required information. IVR 47 is also, in this example, able to access database 69 through network 36. In FIG. 4 as described above, PS 93 does not have a direct link to LAN 75 and database 69 as a means for access. Nor does IVR 47 for that matter. Only an indirect access link is illustrated through line 47, IP 41, T-S 65, and on to LAN 75. An indirect link also may be established through WS 99 having access to LAN 75 and database 69. However, hard-wired direct links may be established between network 36 and LAN 75 to facilitate direct access without going through an IP switch or a Web server as described above.

There are several procedural options for practicing the present invention using the illustrated hardware and SW instances. One of these is to actually transmit IVR voice file messages from IVR 47 to WIA 103 (installed at PC 86 FIG. 4) in real time on a per request basis. This can be accomplished by transmitting the IVR messages thru VoIP over the Internet 15 using H323 protocol as previously described. Another viable option is to allow regular and periodic updates of all IVR voice files propagated from IVR 47 to WS 99 so that voice files can be converted to multimedia files in WS 99. In this case, WS 99 must be linked to IVR 47 by a CTI link enabling telephone calls and Bellcore data transmission. Also in this option, PS function is represented as integrated within WS 99 (translation).

Other useful tasks may be performed according to capabilities already described herein without departing from the spirit and scope of the present invention. For example, during an IVR "Web-session" PS 93 may determine if there are additional files required (in addition to voice files) in order to satisfy a particular interaction. If so, files may be acquired by PS 93 from sources such as CIS database 69, or other conceived data pools. Such additional files may be word processing files or graphics files not attainable through COST IVR interaction. Therefore, in addition to simulated interaction, which emulates a COST IVR interaction, clients may benefit from additional text and graphics already compatible to accessing computerized platforms.

It is reminded that IVR 47 as described above with reference to FIGS. 1–3 is a dual-ported IVR having DNT communication capability with DNT callers. It is noted herein that in one embodiment of the present invention IVR 47 is not digitally enhanced for direct port-to-port communication with DNT callers but may communicate through normal COST IVR ports. In this case PS 93 provides the digital enhancement required to bridge communication, hence PS 93 has a capability for initiating function "calls" to IVR 47, which are presumed to be COST calls.

It will be apparent to one with skill in the art that there are a variety of possible hardware and software implementations that may be incorporated into communications network 11 in order to enable objects of the invention, one of which is to provide simulated IVR functionality to DNT callers. Many such alternate configurations and SW implementations have already been described. Therefore, the methods and apparatus of the present invention should be afforded the broadest scope possible under examination. The spirit and scope of the present invention is limited only by the claims that follow.

What is claimed is:

1. A network-based system for emulating interaction with an interactive voice response unit comprising:
   a client node connected to the network, the client node for soliciting interaction with the interactive voice response unit; and
   a proxy server node connected to the network, the proxy server node accessible to the client node, the interactive voice response unit accessible to the server node;
   characterized in that a client operating the client node establishes a connection with the proxy server node, the proxy server node accepts data input from the client node, and translates the data input into a format for interacting with the interactive voice response unit, whereupon the translated input data is then propagated to the interactive voice response unit, and wherein response data resulting from the translated and propagated input is then propagated to the proxy server node whereupon the response data is translated into a format for dissemination at the client node and propagated thereto.

2. The network-based system of claim 1, wherein the network is a data network.

3. The network-based system of claim 2, wherein the data network is the Internet.

4. The network-based system of claim 1, wherein the client node is a personal computer and the interactive voice response unit is hosted by a communications center.

5. The network-based system of claim 3 wherein the format for interacting with the interactive voice response unit is telephone touch-tone recognition.

6. The network-based system of claim 3 wherein the format for interacting with the interactive voice response unit is voice recognition.

7. The network-based system of claim 3 wherein the response data resulting from the translated and propagated input is an analog voice recording.

8. The network-based system of claim 7 wherein the analog voice recording is translated into a digital voice file before propagation to the client node.

9. The network-based system of claim 8 wherein the digital voice file is one of a WAV file, an MPEG file, or an H.323 protocol audio stream.

10. The network-based system of claim 1 further comprising a second server node connected to the network, the second server node accessible to client node, the proxy server node accessible to the second server node.

11. The network-based system of claim 10, wherein the second server node interfaces with the client node and upon determination of need opens a connection with the proxy server node for interactive voice response interaction.

12. The network-based system of claim 1 wherein the proxy server has access to digital documents held at the communications center hosting the interactive voice response unit.

13. The network-based system of claim 12 wherein digital documents are accessed and served to client node along with the response data from the interactive voice response unit, determination for serving the documents based on need.

14. A distributed software application for emulating interaction with an interactive voice response unit comprising:
   a client portion of the software application residing on a client node connected to a data-packet-network; and
   a network portion of the software application residing on a proxy server node connected to the data-packet-network;
   characterized in that the client portion of the software application identifies and transmits data input from the client node to the network portion of the software application at the proxy server node, whereupon the network portion of the software application translates the data input into input acceptable to the interactive voice response unit, the network portion of the software application calling the interactive voice response unit and propagating the translated input data thereto, and wherein the network portion of the software application receives response data from the interactive voice response unit, and translates that response data into data acceptable to the client node, and propagates the response data to the client node for dissemination.

15. The distributed software application of claim 14 wherein the interactive voice response unit is hosted by a communications center.

16. The distributed software application of claim 14 wherein the data-packet-network is the Internet network.

17. The distributed software application of claim 15 wherein the client node is a personal computer.

18. The distributed software application of claim 15 wherein the format for interacting with the interactive voice response unit is telephone touch-tone recognition.

19. The distributed software application of claim 15 wherein the format for interacting with the interactive voice response unit is voice recognition.

20. The distributed software application of claim 14 wherein the response data comprises an analog voice recording.

21. The distributed software application of claim 14 wherein the response data acceptable to the client node comprises a one of a WAV file, an MPEG file, or an H.323 protocol audio stream.

22. The distributed software application of claim 15 further comprising a portion of the software hosted by the communications center and residing within a Web server also hosted by the communications center.

23. The distributed software application of claim 2, wherein the communications center portion of the distributed software application serves as an interface between the client portion of the software and the network portion of the software.

24. The distributed software application of claim 23 wherein the communications center portion of the distributed software application determines if there is a need for interactive voice response unit interaction at the beginning of a session between the client portion of the software and the communications center portion of the software.

25. A method for simulating interaction with an interactive voice response unit for a client operating on a data-packet-network comprising steps of:
    (a) establishing a data connection on the data-packet-network between the client and a server connected to the data-packet-network, the server functioning as a translation interface between the client and the interactive voice response unit;
    (b) accepting input data from the client at the server and translating the input data to a form acceptable to the interactive voice response unit;
    (c) establishing a connection between the server and the interactive voice response unit;
    (d) sending the translated input data received from the client to the interactive voice response unit;
    (e) receiving response data from the interactive voice response unit at the server and translating the response data into a form acceptable to the client; and
    (f) sending the translated response data to the client for dissemination.

26. The method of claim 25 wherein in step (a), the client is a personal computer and the data-packet-network is the Internet network.

27. The method of claim 26 wherein in step (a), the interactive voice response unit is hosted in a connection-oriented-switched-telephone network and the interfacing link between the server and interactive voice response unit is a CTI link.

28. The method of claim 25 wherein in step (b), the data form acceptable to the interactive voice response unit is telephone touch-tone signaling.

29. The method of claim 25 wherein in step (b), the data form acceptable to the interactive voice response unit is voice recognition.

30. The method of claim 29 wherein in step (b), the voice recognition function of the interactive voice response unit responds to computer-simulated voice.

31. The method of claim 25 wherein in step (c), the established connection is a telephony connection.

32. The method of claim 25 wherein in step (c), the established connection is a data connection.

33. The method of claim 26 wherein in step (e), the data form acceptable to the client comprises one of a WAV file, an MPEG file, or an H.323 protocol audio stream.

* * * * *